Oct. 8, 1940.  J. L. MELZL  2,217,559
EXTRACTOR
Filed Sept. 23, 1939
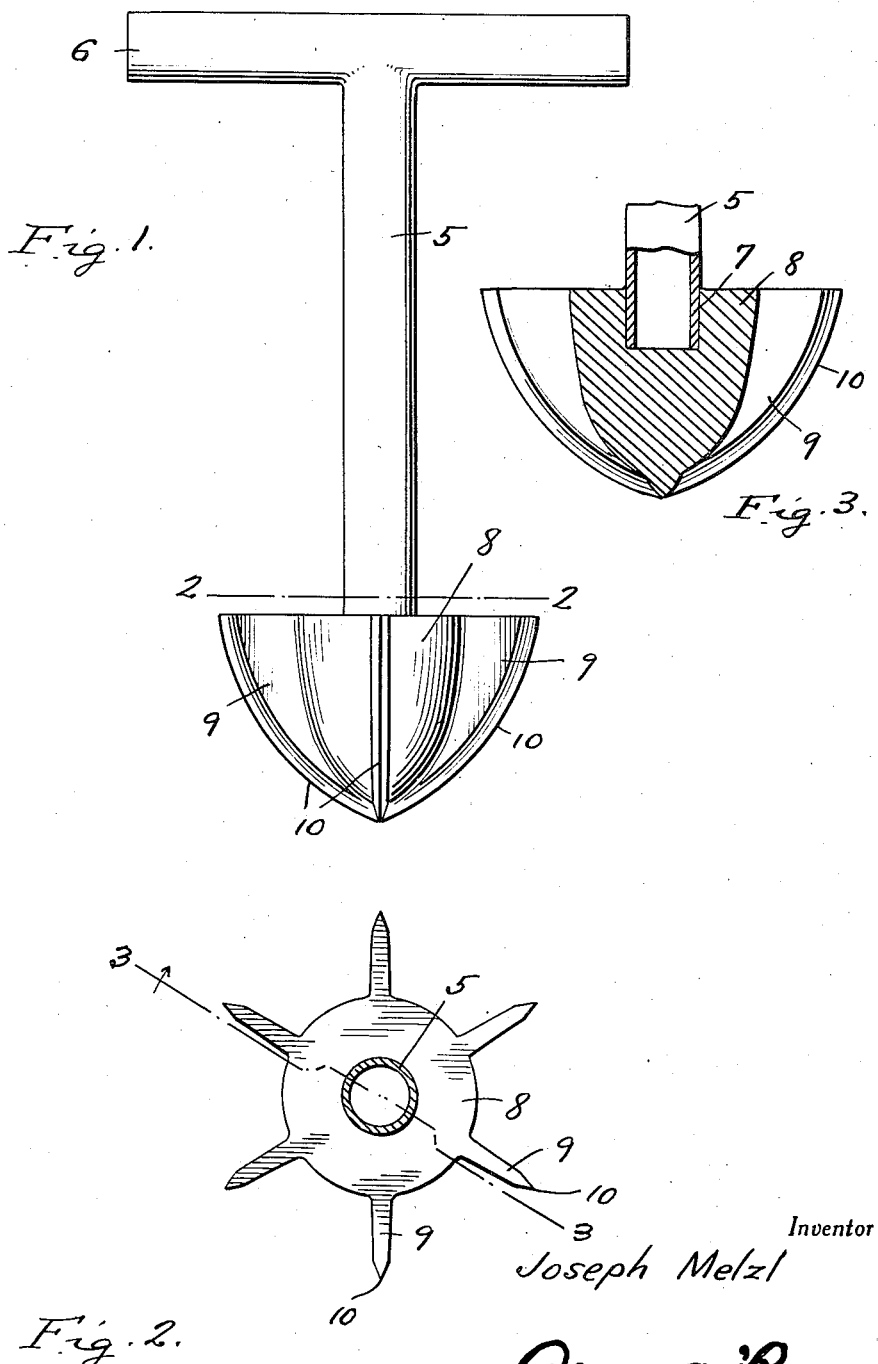
Inventor
Joseph Melzl
By Clarence A. O'Brien
and Hyman Berman
Attorneys Patented Oct. 8, 1940

2,217,559

UNITED STATES PATENT OFFICE 2,217,559

EXTRACTOR

Joseph L. Melzl, Baraboo, Wis.

Application September 23, 1939, Serial No. 296,317

1 Claim. (Cl. 146—3)

This invention relates to extractors, and has for the primary object the provision of an efficient and inexpensive device of this character which will be simple to employ for extracting juices from citrus fruits, vegetables, such as tomatoes, etc., and may be used domestically for extracting potatoes from the skins thereof prior to stuffing the potatoes and for many other purposes in the art of cooking.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an extractor constructed in accordance with my invention.

Figure 2 is a sectional view taken on the line 2—2 of Figure 1.

Figure 3 is a sectional view taken on the line 3—3 of Figure 2.

Referring in detail to the drawing, the numeral 5 indicates an elongated tubular shank or stem having integral with one end a cross member 6 acting as a handle and its opposite end is secured in a socket 7 formed in a head 8. The securing of the stem or shank 5 in the socket 7 may be accomplished in any well known manner and it is preferable that the member 6 be formed on the stem or shank intermediate its ends so as to permit gripping thereof at opposite sides of the shank or stem.

The head 8 is substantially conical shaped having the socket 7 located in its largest end and centrally thereof.

A plurality of radially arranged blades 9 are formed on the head 8 and said blades have arcuately curved cutting edges 10 and each tapers from one end to its opposite end. The large ends of the blades are flush with the large end of the head while the small ends of the blades meet with each other at the apex of the head. The cutting edges of the blades adjacent the apex of the head are of less distance from the walls of the head than the large ends of the blades. Due to the shape of the head and the shape of the blades and their association with each other a medium is provided which may be readily inserted into severed fruit or the like and when rotated with pressure thereon will mash and sever the pulp of the fruit to efficiently remove the juices therefrom. The location of the shank or stem on the head and the shape of the latter will prevent the juices from following the stem or shank during the use of the device.

While I have explained the use of the device for extracting juices also it may be employed for extracting potatoes from the skins thereof prior to stuffing the potatoes and for many other purposes in the cooking art. A device of the character shown and described will be durable, easy to handle, and economical to manufacture, consequently permitting its sale at a very nominal cost.

It is believed that the foregoing description, when taken in connection with the drawing, will fully set forth the construction and advantages of this invention to those skilled in the art to which such device relates, so that further detailed description will not be required.

Having described the invention, what I claim is:

In a device of the character set forth, a substantially conical-shaped solid head having a socket formed in the large end thereof, a stem having one end secured in the socket and arranged in alignment with the apex of the head, a plurality of spaced blades formed on said head and extending from the large end thereof to the apex and each blade tapering towards the apex of the head and each blade having an arcuately curved cutting edge extending the full length thereof, and a cross member formed intermediate its ends on the other end of the stem to provide thereto hand grips arranged at opposite sides of said stem.

JOSEPH L. MELZL.